US011212564B2

(12) United States Patent
Silverman et al.

(10) Patent No.: US 11,212,564 B2
(45) Date of Patent: *Dec. 28, 2021

(54) METHODS AND SYSTEMS FOR DIGITAL FILE DISTRIBUTION TO THEATERS

(71) Applicant: Disney Enterprises, Inc., Burbank, CA (US)

(72) Inventors: Leon Silverman, Burbank, CA (US); James Voris, San Gabriel, CA (US); Mark Arana, West Hills, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/134,751

(22) Filed: Sep. 18, 2018

(65) Prior Publication Data

US 2019/0020911 A1 Jan. 17, 2019

Related U.S. Application Data

(63) Continuation of application No. 13/859,139, filed on Apr. 9, 2013, now Pat. No. 10,212,463.

(Continued)

(51) Int. Cl.
*H04N 21/24* (2011.01)
*H04N 21/262* (2011.01)
(Continued)

(52) U.S. Cl.
CPC ... *H04N 21/2407* (2013.01); *H04N 21/26291* (2013.01); *H04N 21/41415* (2013.01); *H04N 21/812* (2013.01); *H04N 21/8541* (2013.01)

(58) Field of Classification Search
CPC ..... H04N 21/6125; H04N 5/85; H04N 9/8227
See application file for complete search history.

(56) References Cited

U.S. PATENT DOCUMENTS 9,584,876 B2 * 2/2017 Zucchetta ............ H04N 21/458
2002/0073417 A1 6/2002 Kondo
(Continued)

FOREIGN PATENT DOCUMENTS

CN 102158358 A 8/2011

OTHER PUBLICATIONS

First Office Action in Chinese Patent Application No. 2014101646904, dated Nov. 2, 2016.
(Continued)

*Primary Examiner* — Samira Monshi
(74) *Attorney, Agent, or Firm* — Farjami & Farjami LLP

(57) ABSTRACT

Systems and methods for efficiently distributing digital cinema files from a server to a theater are disclosed. The systems and methods may comply with DCI requirements. A server updates an original composition playlist, updates a track file associated with the updated composition playlist, and distributes the updated composition playlist and updated track file to one or more theaters over a communications network. The theater is configured to store the updated track file at a storage containing copies of all track files associated with the updated composition playlist and update the theater's original composition playlist to the updated composition playlist. The server may have a database configured to track the composition playlists and associated track files present in each theater in the system.

18 Claims, 4 Drawing Sheets

Related U.S. Application Data

(60) Provisional application No. 61/801,870, filed on Mar. 15, 2013.

(51) Int. Cl.
  *H04N 21/414* (2011.01)
  *H04N 21/81* (2011.01)
  *H04N 21/8541* (2011.01)

(56) References Cited

U.S. PATENT DOCUMENTS

| | | |
|---|---|---|
| 2004/0181819 A1 | 9/2004 | Theiste et al. |
| 2004/0216163 A1 | 10/2004 | Whitcomb |
| 2005/0155070 A1 | 7/2005 | Slaughter |
| 2008/0281872 A1* | 11/2008 | Mizuno ................ G11B 27/034 |
| 2009/0172028 A1 | 7/2009 | Benitez et al. |
| 2009/0292774 A1* | 11/2009 | Box ................... H04N 21/2143 |
| | | 709/206 |
| 2011/0082744 A1* | 4/2011 | Iida ........................ G11B 27/11 |
| | | 705/14.53 |
| 2011/0246369 A1 | 10/2011 | de Oliveira et al. |
| 2012/0036584 A1 | 2/2012 | Risan |
| 2012/0131686 A1 | 5/2012 | Risan |
| 2013/0051760 A1 | 2/2013 | Ogawa et al. |
| 2013/0054752 A1 | 2/2013 | Herwig |
| 2014/0139738 A1 | 5/2014 | Mehta |
| 2014/0208446 A1 | 7/2014 | Risan |
| 2014/0341376 A1* | 11/2014 | Mitchell .............. H04N 21/835 |
| | | 380/201 |

OTHER PUBLICATIONS

Second Office Action in Chinese Patent Application No. 2014101646904, dated Aug. 15, 2017.

Third Office Action in Chinese Patent Application No. 2014101646904, dated Mar. 21, 2018.

* cited by examiner

METHODS AND SYSTEMS FOR DIGITAL FILE DISTRIBUTION TO THEATERS

CROSS-REFERENCE TO RELATED APPLICATIONS

This application is a continuation of and claims the benefit of U.S. patent application Ser. No. 13/859,139 filed on Apr. 9, 2013, which claims the benefit of U.S. Provisional Application No. 61/801,870 filed on Mar. 15, 2013, which is incorporated herein by reference in its entirety.

TECHNICAL FIELD

The present disclosure relates generally to digital file distribution techniques and more particularly, some embodiments relate to methods and systems for automating digital cinema file distribution to theaters.

DESCRIPTION OF THE RELATED ART

Recent technological developments that have enabled the digital playback and display of feature films at a high resolution have led to the increasing adoption of digital systems that play back digital cinema content. Digital Cinema Initiatives, LLC (DCI) is an entity created by the motion picture studios in recognition of the benefits of adopting industry-wide specifications for digital cinema. DCI has defined industry-wide specifications and requirements for the mastering of, distribution of, and theatrical playback of digital cinema content.

BRIEF SUMMARY OF THE DISCLOSURE

According to various implementations of the disclosed methods and systems, digital cinema files are distributed from a server to a theater. In one implementation, a server receives a request for component parts of a digital content package; the component parts of the digital content package are stored at the server; the component parts of the digital content package are assembled; and the assembled digital content package is encrypted.

In another implementation, a server updates an original composition playlist, updates a track file associated with the updated composition playlist, and automatically distributes the updated composition playlist and updated track file to one or more theaters over a communications network. The theater is configured to store the updated track file at a storage containing copies of all track files associated with the updated composition playlist, and updates the theater's original composition playlist to the updated composition playlist.

In one implementation, the updated composition playlist and updated track file are distributed to a theater only if the theater is geographically located in a region associated with the composition playlist. In another implementation, the server comprises a database of theater information that tracks the current composition playlists associated with all theaters in the server-theater digital cinema distribution system.

In one implementation, a theater initiates a request to receive an updated track file from the server. The server authenticates the theater, determines the theater's current composition playlist and associated track files, and transmits the updated track file and associated updated composition playlist to the theater over a communications network. In another implementation, the server determines the theater's current composition playlist and associated track files by reference to a database of theater information stored in a storage unit communicatively coupled to the server.

Other features and aspects of the disclosed method and system will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION OF THE EMBODIMENTS OF THE DISCLOSURE

Given the large file size of high-resolution coded digital cinema files, methods and systems for the efficient distribution of Digital Cinema files in accordance with DCI are desired. Currently, digital movies may be delivered to theaters via physical hard drives or by satellite transmission. These delivery methods present two problems. First, incremental updates to movies (e.g., regional changes in sound tracks, audio and visual formats such as 2D, 3D, Dolby Sound, and ethnic customizations) are limited to manual deliveries, localized to individual theaters. Second, Digital Content Packages (DCPs) may become bloated with various options for trailers, languages, sound formats, image choices, and other technological changes that cause a large permutation of distribution DCPs. This requires the pre-packaging, quality controlling, and sending of multiple DCPs, which creates logistical issues and expenses for DCPs containing content that is not used in a particular location.

Various implementations of the disclosure illustrate systems and methods for automating the distribution of digital cinema updates to theaters by discretely delivering track file updates after delivering an initial master file to all theaters. Moreover, implementations illustrate systems and methods for the on-demand assembly of digital content packages.

Figure 1:
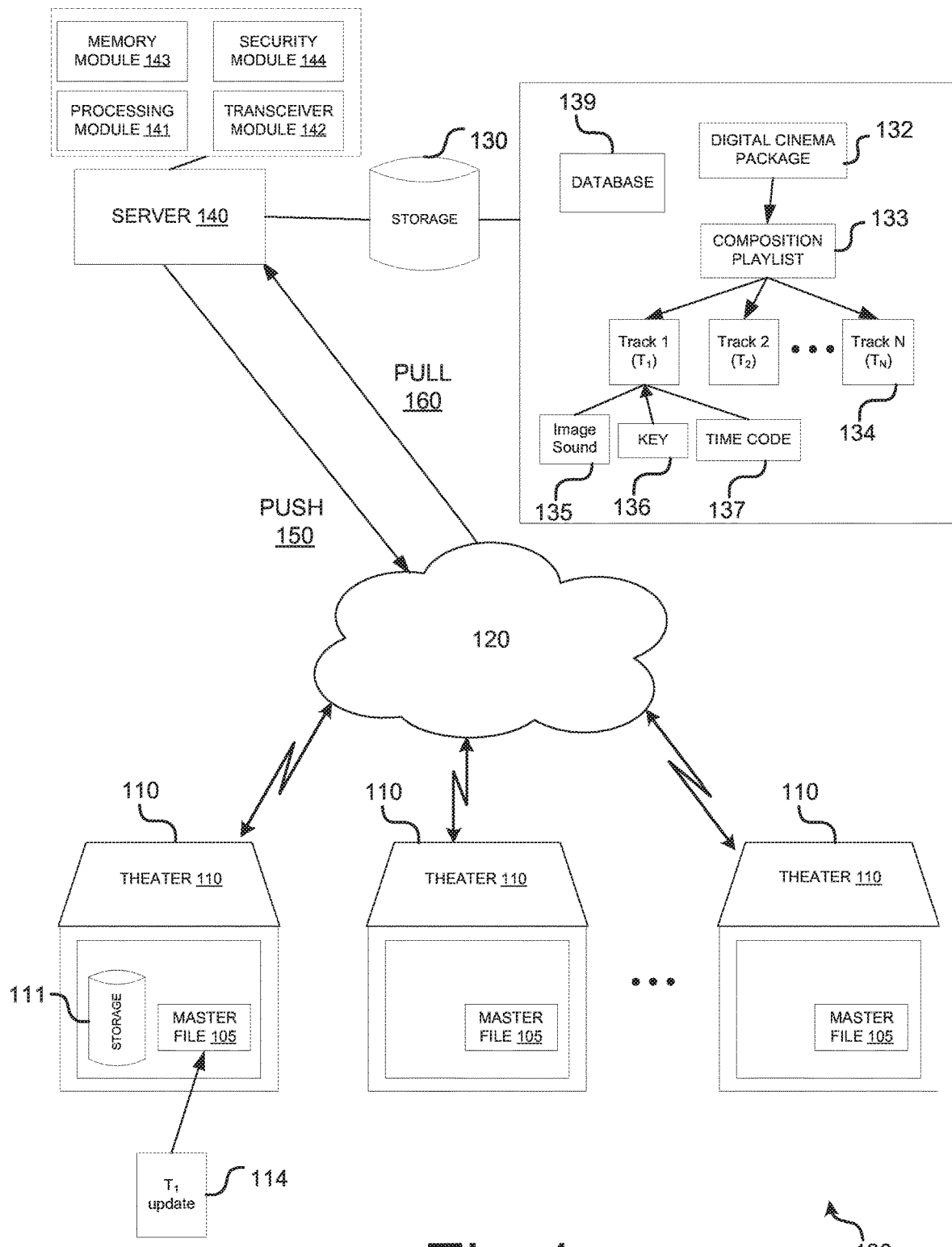
FIG. 1 illustrates a system for automatically distributing digital cinema files in accordance with the present disclosure.

FIG. 1 illustrates a system for distributing digital cinema files in accordance with the present disclosure. In distribution system 100, a server 140 may distribute digital cinema track files 134 stored in storage 130 to a plurality of theaters 110 over communications network 120. Digital cinema files may be automatically pushed (step 150) from server 140 to theaters 110 in response to server-side track file 134 updates. In addition to or instead of pushing digital cinema files, digital cinema files may be pulled (160) by theaters 110 from server 140 in response to a request for a cinema track file update (step 114) initiated at a theater 110.

Communications network 120 may include a cloud-based network, a satellite network, a cellular telephone network, an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), or any combination thereof. Communications network 120 may use a number of communication mediums. The communication medium may be a wireless network system such as a satellite network, a cellular network, a wireless personal area network, a wireless local area network, or other similar communication medium. The communication medium may alternatively be a wired system, such as a coaxial cable system, a fiber optic cable system, an Ethernet cable system, or other similar communication medium.

Server 140 may be operated by a digital cinema file distributor or digital content creator (for example, a movie studio). Server 140 may comprise a single computer unit or a distributed computer system that includes a combination of software and hardware to perform the cinema file distribution functions of distribution system 100. For example, server 140 may include a processing module 141, a transceiver module 142 for communicating over network 120, a memory module 143, a security module 144, storage 130, and a database 139. These modules and components may be separated or integrated. These modules may be disposed within server 140 or communicatively attached to server 140.

With reference now to storage 130, Digital cinema files may be packaged on server 140 in compliance with DCI standards. Storage 130 may include one or more Digital Cinema Package (DCP) files 132. Each DCP 132 is the collection of all files necessary for one digital cinema work such as a motion picture and its trailers.

In one implementation, a DCP 132 may be assembled on demand for a server 140 by storing all of DCP 132 parts in storage 130. In another implementation, the DCP 132 parts may be stored within regional depots. The assembled DCP may be customized to a theater chain, territory or individual screen. In accordance with this implementation, an order for the specific components parts for DCP 132 may be fulfilled by a DCP system that operates on server 140. This order may be fulfilled after the DCP 132 picked component parts are available within server 140. The DCP may be assembled based on the picked component parts. The DCP system may validate that the DCP 132 is DCI compliant and it may generate an encryption key for the DCP 132 to ready it for delivery.

The assembled DCP 132 may be pushed (step 160) by server 140 or pulled (step 160) by an authorized theater 110. During delivery of the DCP, a software based transfer manager (not pictured) may validate that the DCP 132 contains appropriately named files, keys, and all other information. The transfer manager may also track delivery of the DCP 132. For example, it may monitor that the DCP 132 arrives at its destination without checksum errors, report progress during DCP 132 transit, and report if a DCP 132 was created but not sent.

In yet another implementation, the DCP system may be configured to provide an update on the status, configuration, and state of all DCP 132 orders, requests for supplemental material, and generated keys.

A single DCP 132 may have multiple Composition PlayLists (CPLs) 133. For example, a DCP 132 may have three CPLs having a common set of track files 134 but separate dubbed set of sound track files for a movie in three languages (e.g., Chinese, German, and Spanish). Each CPL 133 is a textual list containing instructions on how the elements of a DCP, i.e., track files 134, are played back. A CPL 133 has a time code index that specifies the order in which associated track files are played to present a digital cinema work such as a motion picture.

Track files 134 are the digital cinema files that are discretely distributed in accordance with system 100. Each track file comprises metadata or essence 135 within a file body, and an associated file header and file footer. A track file is also required to have a time code 137 to allow for synchronization with associated track files.

A track file 134 may comprise image metadata 135, sound metadata 135, subtitle (timed text and/or subpicture) metadata or caption metadata. A track file 134 may comprise metadata containing, for example, French subtitles for the first ten minutes of a movie, an advertisement segment, a director's cut of a movie, a movie's alternate ending, a segment of a movie (e.g., first 5 minutes, different rated version scene, credits, etc. . . . ), or the dubs for a movie segment. Each track file 134 has an associated time code 137 for synchronizing its playback with other related (i.e., part of the same cinema work) track files 134. The CPL 133 uses a time code index to play associated track files (e.g., sequential image track files or synchronized image and sound track files) 134 in the correct order.

During the DCP 132 creation process, each track file 134 is encrypted and assigned a unique encryption key 136. Each key 136 may be stored in storage 130. During the delivery process (push 150 or pull 160), each encryption key associated with a track file is delivered to allow for decryption on the receiving end. Key delivery messages may be used to wrap the encryption key in a file format (e.g., XML) that only allows specific trusted devices access to the key.

With reference now to the theater side of the file distribution system, each theater 110 may receive the same initial master file 105 from a content distributor for a cinematic work, comprising a CPL 133 and associated track files 134. Master file 105 is associated with the cinematic work's initial release (e.g., the initial English theatrical version). Subsequent deliveries of an updated CPL with updated track files customized for a specific region or theater (e.g., subtitles or audio (dubs) track files for foreign theaters, image track files that add additional scenes) may then supplement the initial delivery. In this way, redelivery of the entire digital cinema file content (i.e., all track files) associated with a cinema work is not required during incremental updates such as advertisements, additional scenes, alternate endings, etc. . . .

Theaters 110 may have a storage 111 for storing all CPLs and associated track files for each cinema work played at the theater. Storage 111 may have a disk array, hard drive, server or other means for storing and organizing digital cinema content. Related track files 134 may be stored in the same folder or general location within storage 111. A Theater Management System (TMS) or a Screen Management System (SMS) in accordance with DCI standards may manage theaters 110 and their associated storage 111. For example, a TMS may have a theater manager controller that manages playback of all CPL and associated track files in each theater auditorium. The TMS may also manage the storage of all digital cinema content. An SMS may have a user interface to control the playback of a CPL and associated track files within a single theater auditorium. A TMS or SMS may be configured to update the theater's CPL and associated track files when new ones are received.

Server 140 may include a database 139 in storage 130 to manage the delivery of CPL and track file updates to theaters 110 within the file distribution system 100. Database 139 may store the following data for each theater 110: the theater's region or location, the theater's language, the theater's time zone, the theater's current CPL, associated track files (and encryption keys) for cinema works it is currently playing or has played in the past, the theater's history of CPL and track file updates, the theater's status, etc. Additionally, database 139 may include a set of all existing CPLs and associated track files. Each time CPL and track file updates are pushed or pulled from server 140 by a theater 110, server 140 may refer to the applicable database entry. Database 139 may be configured to automatically update the stored data associated with a theater 110 each time server 140 transmits an updated CPL and updated track files to a theater 110. In another implementation, a database entry for a theater may be manually updated via user input (e.g., keyboard and mouse).

Figure 2:
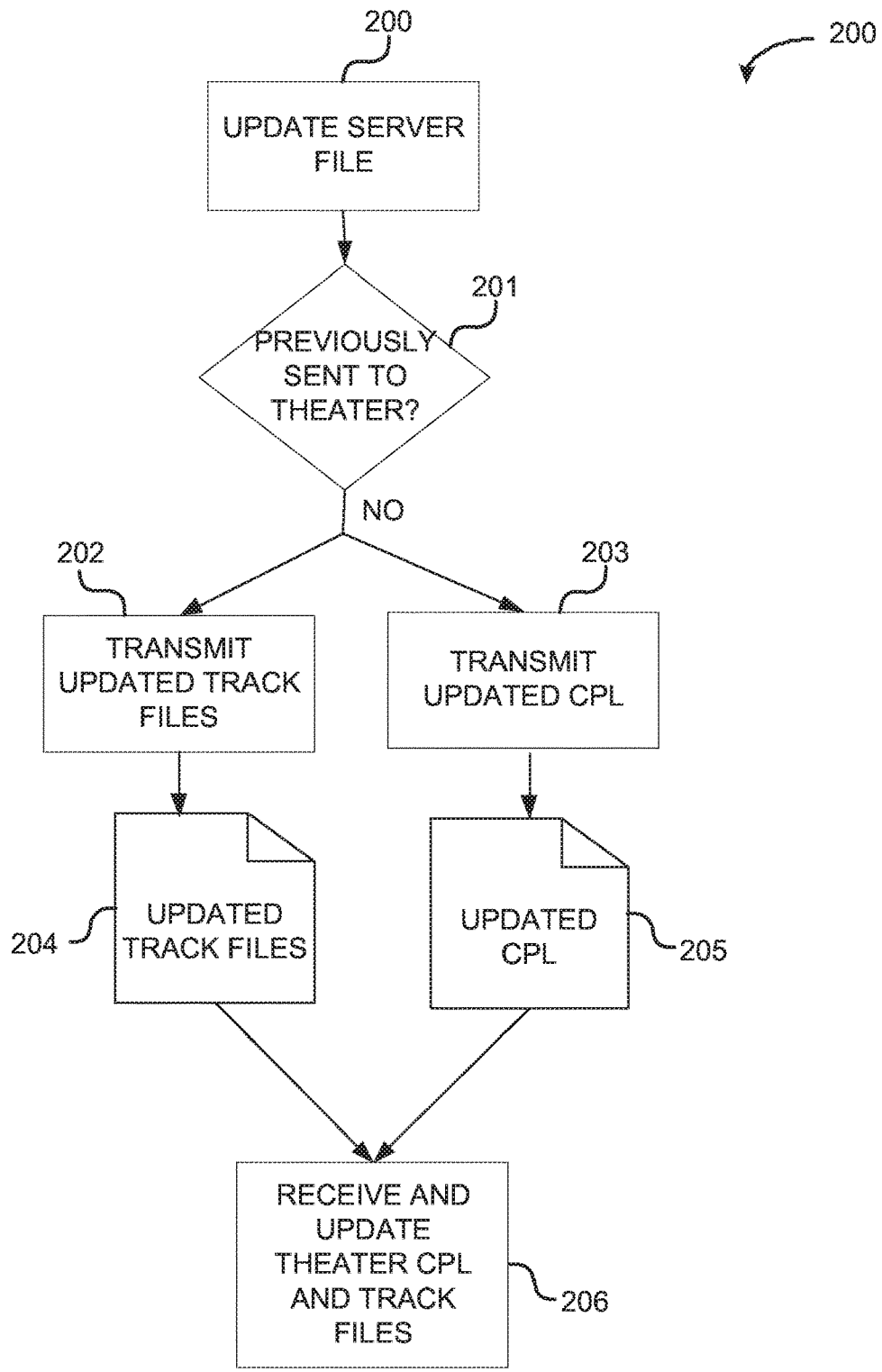
FIG. 2 illustrates a method of pushing digital cinema file updates from a server to a theater.

FIG. 2 illustrates an exemplary method 200 of pushing (step 150) digital cinema file updates from a server 140 to theater 110 in accordance with the system of FIG. 1. As a first step 200, the content distributor or server 140 operator updates a server file (CPL and associated track file) corresponding to a cinema work (e.g., adds an additional track file corresponding to an advertisement, alternate ending, director's cut, new scene, new language release, new subtitles, or new scene with altered product placement). The server update may be stored in storage 130. The update may comprise adding additional content via a new track file, replacing existing content (i.e., replacing a track file), or deleting content (i.e., deleting a track file) associated with an existing CPL. In some implementations, the update may comprise adding a new CPL and new associated track files (e.g., a new set of audio track files associated with a foreign release of a film). In other implementations, the update may comprise replacing or modifying an existing CPL. Theaters 110 corresponding to the updated CPL and associated track files may be tagged in database 139. For example, if a server file update comprises adding a new CPL and associated track files for a new foreign release of a feature film, theaters in the applicable foreign country may be tagged for update in database 139.

At step 201 server 140 determines if the updated CPL or updated track files have been previously transmitted to one or more corresponding theaters 110. If they have not, server 140 may transmit in parallel the updated CPL 205 and updated track files 204 (steps 202-203) along with track file encryption keys to theater 110. The server may transmit only the updated track files that do not reside in storage 111 in theater 110. The updated track files may be transmitted automatically or in response to user input at the server 140. A packing list as required by DCI standards may also be transmitted. A checksum of the transmitted updated CPL 205 and updated track files 204 may be performed to detect errors during file transmission. If the checksum detects errors during transmission, the files may be retransmitted. After successful transmission, server 140 may update its database 139 to record the updated CPL and track files associated with theater 110.

At step 206, the updated track files 204 and updated CPL 205 are received at a theater 110. Theater 110 may store the updated track file at storage 111 in the same folder or directory as all track files associated with the updated composition playlist. The corresponding theater CPL and associated track files are then updated. Updating the CPL may comprise overwriting the original CPL or rewriting the time code index in the original CPL to match the time code index in the updated CPL. Updating the track files may comprise deleting an original track file associated with the same time code as an updated track file. In other implementations, updating the track files may comprise adding the updated track files 204 to the theater 110's original set of track files. In yet further implementations, updating the track files may comprise decrypting the track file with associated encryption keys that are delivered.

Figure 3:
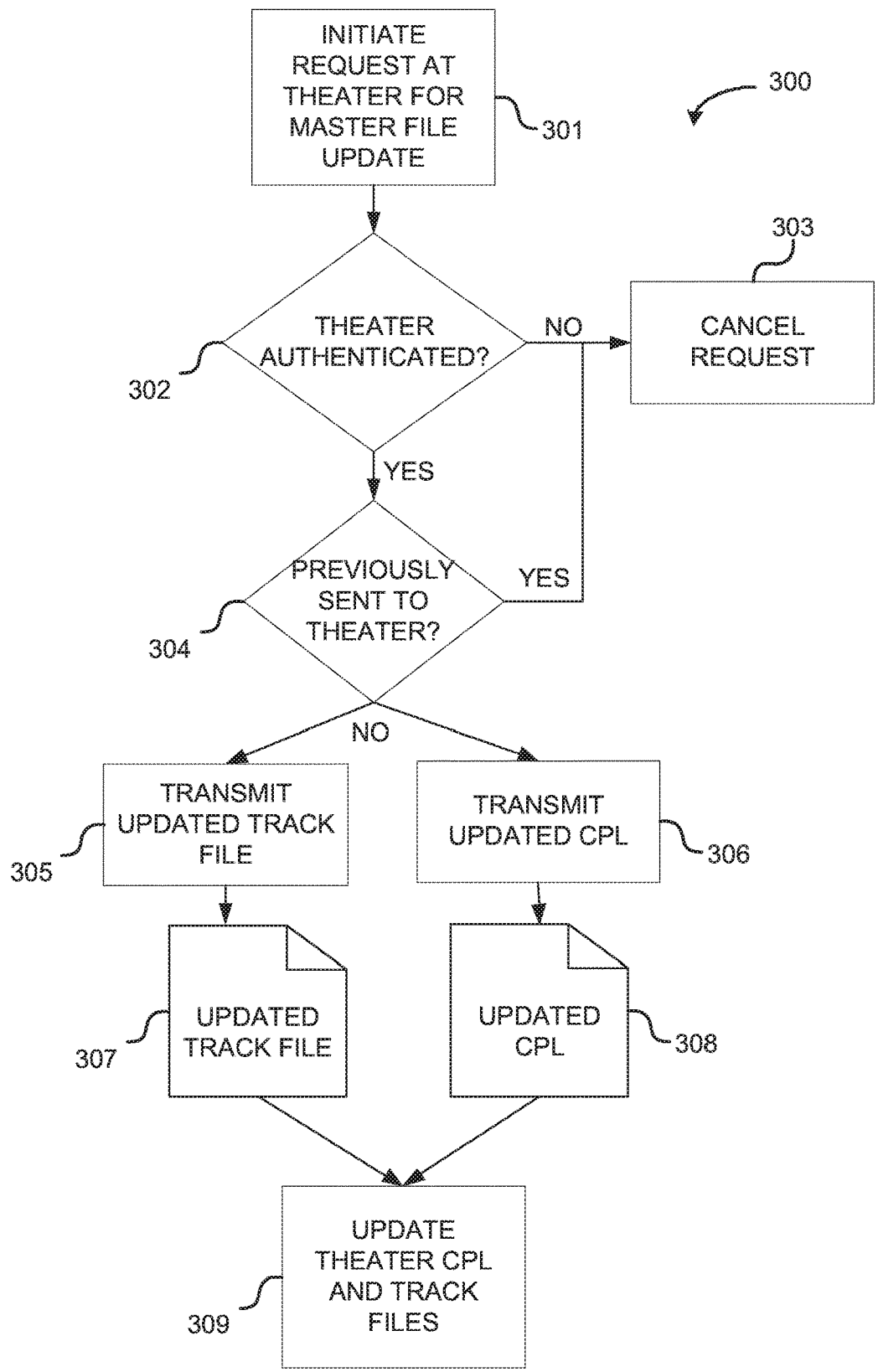
FIG. 3 illustrates a method of pulling digital cinema file updates from a server to a theater.

FIG. 3 illustrates an exemplary method 300 of pulling (step 160) digital cinema file updates from a server by a theater 110 in accordance with the system of FIG. 1. As a first step 301, theater 110 sends a request to a server to update its master file 105 (step 301) associated with digital cinema content, i.e., its CPL and associated track files. Theater 110 may request a specific track file update (step 114). For example, theater 110 may request track files and the corresponding CPL associated with a director's cut, an alternate ending, an advertisement, an added scene, a subtitle, or a dub. In some implementations, theater 110 may iteratively or periodically request updates. At step 302, server 140 authenticates the requesting theater 110 before it permits it to pull any digital cinema content from its storage 130. If theater 110 cannot be authenticated, the request is canceled (step 303). The security module 144 of server 140 may perform authentication of the theater 110. Security module 144 may use any number of authentication methods. For example, it may use password authentication, digital signature authentication, IP SEC authentication, Secure Sockets Layer (SSL) authentication, public-key cryptography authentication, etc.

If the theater is authenticated (step 302), a parallel process to the one described above with respect to push method 200 may be performed. If the updated CPL or updated track files have been previously transmitted to theater 110 (step 304), the theater request may be canceled (step 303). If they have not, server 140 may transmit in parallel the updated CPL 308 and updated track file 307 (steps 305-306) along with track file encryption keys to theater 110. A packing list as required by DCI standards may also be transmitted. A checksum of the transmitted updated CPL 308 and updated track files 307 may be performed to detect errors during file transmission. If the checksum detects errors during transmission, the files may be retransmitted. After successful transmission, server 140 may update its database 139 to record the updated CPL and track files associated with theater 110.

At step 309 the updated track files 307 and updated CPL 308 are received at a theater 110. Theater 110 may store the updated track file at storage 111 in the same folder or directory as all track files associated with the updated composition playlist. The corresponding theater CPL and associated track files are then updated. Updating the CPL may comprise overwriting the original CPL or rewriting the time code index in the original CPL to match the time code index in the updated CPL. Updating the track files may comprise deleting an original track file associated with the same time code as an updated track file. In other implementations, updating the track files may comprise adding the updated track files 307 to the theater 110's original set of track files. In yet further implementations, updating the track files may further comprise decrypting the track file with associated encryption keys that are delivered.

Figure 4:
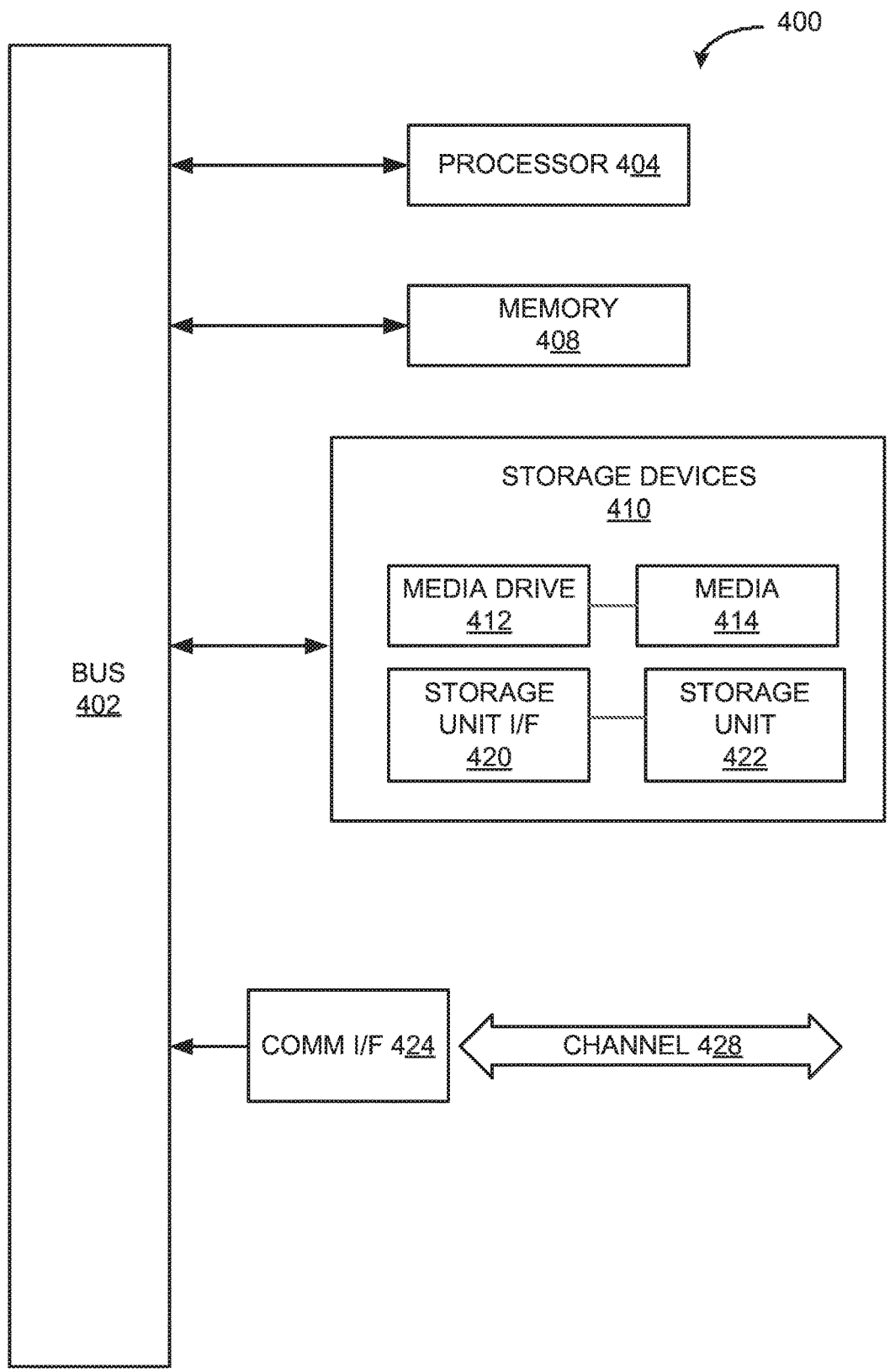
FIG. 4 illustrates an example computing module that may be used to implement various features of the methods and apparatuses disclosed herein.

FIG. 4 illustrates an example computing module that may be used to implement various features of the methods and apparatuses disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 4. Various embodiments are described in terms of this example-computing module 400. After reading this description, it will become apparent to a person skilled in the relevant art how to implement the application using other computing modules or architectures.

Referring now to FIG. 4, computing module 400 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 602, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 600.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
storing an original composition playlist in a storage, the original composition playlist specifying an order in which a first plurality of track files are to be played back for presentation of a movie, wherein the first plurality of track files comprise image track files and audio track files corresponding to video content and audio content of a first version of the movie respectively;
transmitting, over a network, a request from a theater to a server for one or more new track files and an updated composition playlist;
in response to the request, receiving at the theater, over the network, the updated composition playlist and the one or more new track files, the updated composition playlist specifying an order in which a second plurality of track files are to be played back for presentation of a modified version of the movie, wherein the second plurality of track files comprise the one or more new track files and at least some of the first plurality of track files corresponding to the video content and the audio content of the first version of the movie, wherein the one or more new track files comprise a portion of video content or a portion of audio content of the modified version of the movie, the updated composition playlist and the one or more new track files being based on a record of previously provided composition playlists and track file updates;
storing the one or more new track files in the storage;
updating the original composition playlist with the updated composition playlist, wherein updating the original composition playlist comprises overwriting the original composition playlist or rewriting a time code index in the original composition playlist.

2. The method of claim 1, wherein storing the one or more new track files further comprises deleting one of the first plurality of track files, the one of the first plurality of track files comprising a time code that is the same as a time code of one of the one or more new track files.

3. The method of claim 1, wherein the audio content of the first version of the movie comprises a first language, and wherein the portion of the audio content of the modified version of the movie comprises a second language different than the first language.

4. The method of claim 1, wherein the request from the theater comprises a request to update a master file associated with the first version of the movie, the master file comprising the original composition playlist and the first plurality of track files.

5. The method of claim 1, wherein the theater is authenticated by the server in response to the request, prior to the theater receiving the one or more new track files and the updated composition playlist.

6. The method of claim 1, further comprising:
playing back, using a theater management system of the theater, the modified version of the movie using the updated composition playlist.

7. The method of claim 1, wherein storing the one or more new track files comprises storing the one or more new track files in a same folder or directory as the first plurality of track files.

8. A system for a theater, comprising:
a processor;
a storage configured to store an original composition playlist, the original composition playlist specifying an order in which a first plurality of track files are to be played back for presentation of a movie, wherein the first plurality of track files comprise image track files and audio track files corresponding to video content and audio content of a first version of the movie, respectively; and
a non-transitory computer readable medium having executable instructions stored thereon, that, when executed by the processor, performs operations of:
transmit, over a network, a request to a server for one or more new track files and an updated composition playlist;
in response to the request, receive, over the network, the one or more new track files and the updated composition playlist, the updated composition playlist specifying an order in which a second plurality of track files are to be played back for presentation of a modified version of the movie, wherein the second plurality of track files comprise the one or more new track files and at least some of the first plurality of track files corresponding to the video content and the audio content of the first version of the movie, wherein the one or more new track files comprise a portion of video content or a portion of audio content of the modified version of the movie, the updated composition playlist and the one or more new track files being based on a record of previously provided composition playlists and track file updates; and
update the original composition playlist with the updated composition playlist, wherein updating the original composition playlist comprises overwriting the original composition playlist or rewriting a time code index in the original composition playlist;
wherein the storage is further configured to store the one or more new track files.

9. The system of claim 8, wherein storing the one or more new track files comprises deleting one of the first plurality of track files, the one of the first plurality of track files comprising a time code that is the same as a time code of one of the one or more new track files.

10. The system of claim 8, wherein the audio content of the first version of the movie comprises a first language, and wherein the portion of the audio content of the modified version of the movie comprises a second language different than the first language.

11. The system of claim 8, wherein the request comprises a request to update a master file associated with the first version of the movie, the master file comprising the original composition playlist and the first plurality of track files.

12. The system of claim 8, wherein the theater is authenticated by the server in response to the request, prior to receiving the one or more new track files and the updated composition playlist.

13. The system of claim 8, further comprising a theater management system configured to play back the modified version of the movie using the updated composition playlist.

14. The method of claim 1, further comprising:
prior to storing the original composition playlist and transmitting the request receiving at the theater from the server, over the network, the original composition playlist and the first plurality of track files.

15. The method of claim 14, wherein prior to the theater receiving the one or more new track files and the updated composition playlist, the method further comprising:

authenticating, by the server, the theater; and determining, by the server, what version of a composition playlist corresponding to a presentation of the movie was previously transmitted to the theater.

16. A method comprising:

transmitting, over a network, a request to a server for one or more new track files and an updated composition playlist;

in response to the request, receiving, over the network, the one or more new track files and the updated composition playlist, the updated composition playlist specifying an order in which the one or more new track files are to be played back for presentation of a movie, wherein the one or more new track files comprise audio and video content of the movie, the updated composition playlist and the one or more new track files being based on a record of previously provided composition playlists and track file updates; and playing back the audio and video content of the movie in accordance with the order.

17. The method of claim 16, wherein the request comprises a request to update a master file associated with a first version of the movie, the master file comprising an original composition playlist and a first plurality of track files.

18. The method of claim 16, wherein the request is transmitted from a theater to the server, and wherein the method further comprises:

authenticating, by the server, the theater; and determining, by the server, what version of a composition playlist corresponding to a presentation of the movie was previously transmitted to the theater.

* * * * *